US 6,731,623 B2

(12) United States Patent
Lee et al.

(10) Patent No.: US 6,731,623 B2
(45) Date of Patent: May 4, 2004

(54) DATA TRANSMISSION METHOD FOR HYBRID ARQ TYPE II/III DOWNLINK OF A WIDE-BAND RADIO COMMUNICATION SYSTEM

(75) Inventors: Yu-Ro Lee, Seoul (KR); Jae-Hong Park, Seoul (KR); Chong-Won Lee, Seoul (KR); Jeong-Hwa Ye, Seoul (KR)

(73) Assignee: Hyundai Electronics Industries Co., Ltd. (KR)

( * ) Notice: Subject to any disclaimer, the term of this patent is extended or adjusted under 35 U.S.C. 154(b) by 556 days.

(21) Appl. No.: 09/832,250

(22) Filed: Apr. 10, 2001

(65) Prior Publication Data

US 2002/0009999 A1 Jan. 24, 2002

(30) Foreign Application Priority Data

| Apr. 10, 2000 | (KR) | 2000-18646 |
| May 16, 2000 | (KR) | 2000-25966 |
| Jun. 26, 2000 | (KR) | 2000-35455 |
| Jun. 26, 2000 | (KR) | 2000-35456 |
| Aug. 4, 2000 | (KR) | 2000-45162 |
| Aug. 21, 2000 | (KR) | 2000-48435 |
| Oct. 27, 2000 | (KR) | 2000-63613 |

(51) Int. Cl.$^7$ .................................................. H04J 3/24
(52) U.S. Cl. ........................ 370/349; 370/394; 370/338
(58) Field of Search ................................. 370/352–356, 370/338, 349, 389, 394, 465, 466, 474; 714/746, 748, 749, 750, 751; 455/422, 426

(56) References Cited

U.S. PATENT DOCUMENTS

| 5,715,257 A | 2/1998 | Matsuki et al. ............... 371/32 |
| 5,729,541 A | 3/1998 | Hamalainen et al. ......... 370/337 |
| 5,729,557 A * | 3/1998 | Gardner et al. .............. 714/774 |
| 5,946,320 A * | 8/1999 | Decker ......................... 370/428 |
| 6,157,628 A | 12/2000 | Uebayashi et al. .......... 370/335 |
| 6,169,909 B1 | 1/2001 | Koshino ....................... 455/557 |
| 6,230,297 B1 * | 5/2001 | Bentall et al. ............... 714/758 |
| 6,519,731 B1 * | 2/2003 | Huang et al. ................ 714/751 |
| 6,542,931 B1 * | 4/2003 | Le et al. ...................... 709/228 |

* cited by examiner

Primary Examiner—Ajit Patel
(74) Attorney, Agent, or Firm—Baker Botts LLP

(57) ABSTRACT

A data processing method for a hybrid ARQ type II/III downlink of a wide-band radio communication system, wherein SRNC and CRNC are located on the same radio network, includes the steps of: a) generating RLC-PDU in a RLC layer of the SRNC and generating a PDU having RLC-PDU information needed for supporting the hybrid ARQ type II/III based on a header of the RLC-PDU (HARQ-RLC-Control-PDU); b) transmitting the RLC-PDU and the HARQ-RLC-Control-PDU to a MAC-D, treating a general user part of a MAC layer through a logical channel; c) transmitting the RLC-PDU and the HARQ-RLC-Control-PDU from the MAC-D to a MAC-C/SH, treating common/shared channel part of the MAC layer; d) transforming the PLC-PDU and the HARQ-RLC-Control-PDU to MAC-PDU and the HARQ-MAC-Control-PDU, respectively, in the MAC-C/SH, and allocating a format TFI1 of the MAC-PDU and TFI2 of the HARQ-MAC-Control-PDU, and transmitting the TFI1 and TFI2 to the MAC-D, and transmitting the MAC-PDU and the HARQ-MAC-Control-PDU to a physical layer of BTS, through a transport channel; and e) forming the TFI1 and the TFI2 in the MAC-D to a TFCI, then transmitting the TFCI to the user equipment through a first physical channel, and transforming the MAC-PDU and the HARQ-MAC-Control-PDU to a radio frame, then transmitting the radio frame to the mobile station through a second physical channel.

19 Claims, 10 Drawing Sheets

DATA TRANSMISSION METHOD FOR HYBRID ARQ TYPE II/III DOWNLINK OF A WIDE-BAND RADIO COMMUNICATION SYSTEM

FIELD OF THE INVENTION

The present invention relates to a data processing method for hybrid automatic repeat for request (hereinafter, referred to as an ARQ) type II/III on a downlink of a wide-band radio communication system; and, more particularly, to a method for processing a radio link control protocol data unit (RLC-PDU) and a HARQ-RLC-Control-PDU, which is extracted from the RLC-PDU, by using a transport channel such as a downlink shared channel (DSCH), wherein the RLC-PDU is used in W-CDMA based on a next generation mobile communication network, such as an international mobile telecommunication (IMT)-2000 and a universal mobile telecommunications system (UMTS), and to a recording media having a computer readable program for carrying out the method.

DESCRIPTION OF THE PRIOR ART

Terms used in this specification will be described.

"A radio network controller-radio link control (RNC-RLC)" is a radio link control protocol level entity of a radio network controller (RNC).

"A radio network controller-medium access control dedicated entity (RNC-MAC-D)" is a medium access control protocol level dedicated entity of a radio network controller (RNC).

"A radio network controller-medium access control common/shared entity (RNC-MAC-C/SH)" is a medium access control protocol level terminal common/shared entity of a radio network controller (RNC).

"Node B-L1" is a physical channel layer entity of a node B. The node B represents a base transceiver station (BTS) in an asynchronous IMT-2000 system. In this specification, the node B is used as the same meaning as the base transceiver station (BTS).

"User equipment-L1 (UE-L1)" is a physical channel level entity of a user equipment (UE) (or a mobile station).

"User equipment-medium access control common/shared dedicated entity (UE-MAC-C/SH)" is a medium access control protocol level terminal common/shared entity of a user equipment (UE) (or a mobile station).

"User equipment-medium access control dedicated entity (UE-MAC-D)" is a medium access control protocol level terminal dedicated entity of a user equipment (UE) (or a mobile station).

"User equipment-radio link control (UE-RLC)" is a radio link control protocol level entity of a user equipment (UE) (or a mobile station).

"User equipment-radio resource control (UE-RRC)" is a radio resource control protocol level entity of a user equipment (UE) (or a mobile station).

"Iub" denotes an interface between the RNC and the Node B (BTS).

"Iur" denotes an interface between the RNC and another RNC.

"Uu" denotes an interface between the Node B and the UE.

"Logical channel" is a logical channel used for transmitting and receiving data between the RLC protocol entity and MAC protocol entity.

"Transport channel" is a logical channel used for transmitting and receiving data between the MAC protocol entity and a physical layer.

"Physical channel" is a practical channel used for transmitting and receiving data between a mobile station and a BTS.

When transporting the data from a radio network of a UMTS terrestrial radio access network (UTRAN) to the mobile station (MS), a Hybrid ARQ type II/III which has superior throughput than a Hybrid ARQ type I may be used.

FIG. 2 is a diagram showing a general wide-band radio communication network (WCDMA). A UTRAN environment is used as an example in this drawing.

As described in FIG. 2, the UTRAN includes a user equipment (UE) 10, an asynchronous radio network 20 and a radio communication core network 30, such as a GSM-MAP core network.

A Hybrid ARQ type II/III is adapted between the UE and the asynchronous radio network 200. When a received data has an error, a receiving part requests a transmission part to re-transmit the received data.

A protocol stack structure in the above-referenced interlocking structure is illustrated in FIG. 4.

FIG. 3 is a diagram showing a general UTRAN. In FIG. 3, the In is an interface between the radio communication core network 300 and the asynchronous radio network 200, and, the Iur means a logical interface between radio network controllers (RNC) of the asynchronous radio networks 200 and the Iub shows an interface between the RNC and the Node B. Meanwhile, the Uu shows a radio interface between the UTRAN and the UE.

In here, the Node B is a logical node, which is responsible for a radio transmission/receiving from one or more cell to the UE.

Generally in the UTRAN, if a received data has an error, the receiving part requests re-transmission of the data to the transmission part by using an automatic repeat request (ARQ) method. The ARQ method is divided to ARQ type I, II and III, and technical characteristics of each type are described below.

The ARQ is an error control protocol, which automatically senses an error during transmission and then requests re-transmission of the error-containing block. That is, the ARQ is one of data transmission error control methods, and when an error is detected, automatically generates a re-transmission request signal to cause re-transmission of the data.

The ARQ method is used in the UTRAN for a transmission packet data. The receiving part requests the transmission part to re-transmit an error-containing packet. However, when using the ARQ method, if the number of re-transmission requests are increased, then the throughput, which is amount of data transmitted in a predetermined period, is decreased. To solve the problem, the ARQ can be used along with a forward error correction coding (FEC) method, which is called as a hybrid ARQ.

The hybrid ARQ has three types I, II and III.

In case of type I, one coding rate is selected, for example, one coding rate selected from no coding, rate 1/2 and rate 1/3 of convolutional codings, according to channel environment or required quality of service (QoS) and the selected coding rate is continuously used. If there is a re-transmit request, the receiving part removes pre-received data and the transmission part re-transmits the data with the pre-transmitted coding rate. In this case, the coding rate is not changed according to changeable channel environment, so, when compared with the type II and III the throughput may be decreased.

In case of type II ARQ, if the receiving part requests data re-transmission, then the data is stored onto a buffer at the receiver and the stored data is combined with the retransmitted data. That is, at first, the data is transmitted with a high coding rate and in case of re-transmitting, the data is transmitted with a lower coding rate and it is combined with the pre-received stored data to increase efficiency compared to the type I. For example, a convolutional coding rate 1/4, which is a mother code, may generates coding rates 8/9, 2/3 or 1/4 by puncturing, and it is called a rate compatible punctured convolutional (RCPC) code. The RCPC code is illustrated in FIG. 1.

Meanwhile, a rate compatible punctured turbo (RCPT) code is obtained by puncturing a turbo code. Referring to FIG. 1, at first, a data is transmitted with a coding rate of 8/9, and this version of the data is called as ver(0), an error is detected in the data by checking a cyclic redundancy check (CRC) and the data is stored to a buffer and re-transmission is requested. At this time, the re-transmission is performed with a coding rate 2/3 and the re-transmission version is designated ver(1).

The receiving part combines the ver(0) data stored in the buffer and the ver(1) data, then the combined data is decoded and checked by the CRC. The above-referenced process is repeated until no error is detected, then, the last transmitted ver(n) is combined with a pre-transmitted ver(n−a)(0<a<n).

The type III ARQ is similar to the type II ARQ. It is different in that the re-transmitted ver(n) data is decoded before combined with the ver(n−a) data, and checked by the CRC then, if there is no error, the ver(n) data is transmitted to an upper layer. If an error is detected, the retransmitted ver(n) data is combined with ver(n−a) and checked by the CRC to determine if further data re-transmission is necessary.

Accordingly, the hybrid ARQ type II/III is used for efficient data transmission in the UTRAN.

The hybrid ARQ type II/III combines a first data which is encoded with a high coding rate and a re-transmit data which is encoded with a low coding rate in the receiver to increase the throughput. Therefore, relational information between a sequence number and a retransmitted version of a protocol data unit (PDU) is needed to be known in advance. The relation information should be transmitted with a low coding rate, regardless of the retransmission coding rate, thereby ensuring its quality of communication.

However, for the hybrid ARQ type II/III in the UTRAN, the data is transmitted with the high coding rate, thereby increasing the possibility of an error of a header of a RLC-PDU. Therefore, a method of stably transmitting the RLC-PDU header is required.

SUMMARY OF THE INVENTION

It is, therefore, an object of the present invention to provide a data delivery method for hybrid ARQ type II/III on the downlink of wide-band radio communication system and a computer readable recording media for having instructions for performing the method.

In accordance with an aspect of the present invention, there is provided a data processing method for a hybrid ARQ type II/III on a downlink of a wide-band radio communication system, wherein a serving radio network controller (hereinafter, referred to as a SRNC) which is directly connected to a user equipment to allocate wireless resources to the user equipment and provides services by interlocking with a wireless communication core network in case of a call connection and a controlling radio network controller (hereinafter, referred to as a CRNC) which controls a sharing channel of a radio network are located on the same radio network, comprising the steps of: a) generating a radio link control-protocol data unit (hereinafter, referred to as a RLC-PDU) in a radio link control (hereinafter, referred to as a RLC) layer of the SRNC, and generating a part having RLC-PDU information needed for supporting the hybrid ARQ type II/III based on a header of the RLC-PDU (hereinafter, referred to as a HARQ-RLC-Control-PDU); b) transmitting the RLC-PDU and the HARQ-RLC-Control-PDU to a medium access control dedicated (hereinafter, referred to as a MAC-D) treating a general user part of a MAC layer through a logical channel; c) transmitting the RLC-PDU and the HARQ-RLC-Control-PDU from the MAC-D to a medium access control common/shared (hereinafter, referred to as a MAC-C/SH) treating common/shared channel part of the MAC layer; d) transforming the PLC-PDU and the HARQ-RLC-Control-PDU to MAC-PDU and the HARQ-MAC-Control-PDU, respectively, in the MAC-C/SH and allocating a transport format indicator 1 (TFI1) of the MAC-PDU and a transport format indicator 2 (TFI2) of the HARQ-MAC-Control-PDU and transmitting the TFI1 and TFI2 to the MAC-D, and transmitting the MAC-PDU and the HARQ-MAC-Control-PDU to a physical layer of BTS, through a transport channel; and e) forming the TFI1 and the TFI2 of the MAC-D to a transport format combination set (TFCI) then transmitting the TFCI to the user equipment through a first physical channel, and transforming the MAC-PDU and the HARQ-MAC-Control-PDU to a radio frame, then transmitting the radio frame to the mobile station through a second physical channel.

Also, the present invention may further comprising the step of: f) storing the RLC-PDU to a buffer, extracting the RLC-PDU of the buffer by using the HARQ-RLC-Control-PDU, transmitting the RLC-PDU to an upper layer after interpreting and transmitting the response to the radio network.

In accordance with another aspect of the present invention, there is provided a computer readable data recording media embodying instructions for the hybrid ARQ type II/III on a downlink of a wide-band radio communication system, wherein a serving radio network controller (hereinafter, referred to as a SRNC) which is directly connected to a user equipment to allocate wireless resources to the user equipment and provides services by interlocking with a wireless communication core network in case of a call connection and a controlling radio network controller (hereinafter, referred to as a CRNC) which controls a sharing channel of a radio network are located on the same radio network, comprising the functions of: a) generating a radio link control-protocol data unit (hereinafter, referred to as a RLC-PDU) in a radio link control (hereinafter, referred to as a RLC) layer of the SRNC and generating a part having RLC-PDU information needed for supporting the hybrid ARQ type II/III based on a header of the RLC-PDU (hereinafter, referred to as a HARQ-RLC-Control-PDU); b) transmitting the RLC-PDU and the HARQ-RLC-Control-PDU to a medium access control dedicated (hereinafter, referred to as a MAC-D) treating a general user part of a MAC layer through a logical channel; c) transmitting the RLC-PDU and the HARQ-RLC-Control-PDU of the MAC-D to a medium access control common/shared (hereinafter, referred to as a MAC-C/SH) treating common/ shared channel part of the MAC layer; d) transforming the PLC-PDU and the HARQ-RLC-Control-PDU to MAC-PDU and the HARQ-MAC-Control-PDU, respectively, in the MAC-C/SH and allocating a transport format indicator 1 (TFI1) of the MAC-PDU and a transport format indicator 2 (TFI2) of the HARQ-MAC-Control-PDU and transmitting the TFI1 and TFI2 to the MAC-D, and transmitting the MAC-PDU and the HARQ-MAC-Control-PDU to a physical layer of BTS, through a transport channel; and e) forming the TFI1 and the TFI2 of the MAC-D to a transport format combination set (TFCI) then transmitting the TFCI to the user equipment through a first physical channel, and transforming the MAC-PDU and the HARQ-MAC-Control-PDU to a radio frame, then transmitting the radio frame to the mobile station through a second physical channel.

Also, the present invention further comprising the step of: f) storing the RLC-PDU to a buffer, extracting the RLC-PDU of the buffer by using the HARQ-RLC-Control-PDU, transmitting the RLC-PDU to an upper layer after interpreting and transmitting the response to the radio network.

The present invention is a method for realizing the hybrid ARQ type II/III on the downlink of an asynchronous mobile communication system which includes the CRNC and the SRNC, and may be adapted in a technical field where packet data service is used.

In an asynchronous communication system which has the CRNC and the SRNC on a same asynchronous network, the present invention of using the hybrid ARQ type II/III may increase system efficiency by combining a changeable coding rate, a pre-transmitted data and a re-transmitted data.

To perform the combining on the hybrid ARQ type II/III, the receiving part may know information of the current receiving RLC-PDU, and the information composing part of the RLC-PDU should be transmitted more stably than transmitted data.

For the above, the present invention generates the HARQ-RLC-Control-PDU referring to the RLC-PDU, wherein the HARQ-RLC-Control-PUD has information of the RLC-PDU which is used for supporting the hybrid ARQ type II/III. At this time, the HARQ-RLC-Control-PDU includes sequence number of the RLC-PDU and a version number.

The RLC-PDU and the HARQ-RLC-Control-PUD are transmitted from a RLC protocol entity to a MAC-D protocol entity by using a different or same logical channel and transmitted from a MAC-C/SH protocol entity to a physical layer by using a downlink shared channel (DSCH) and transmitted to a receiving part through a physical channel, such as a physical downlink shared channel (PDSCH).

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Hereinafter, a data processing method for hybrid ARQ type II/III on a downlink of a wide-band radio communication system according to the present invention will be described in detail referring to the accompanying drawings.

Referring to FIG. 5, an asynchronous mobile communication system having an interlocking structure is described. Under the interlocking structure, a UMS terrestrial radio access network (UTRAN) 200 may have one or more radio network controller (RNC). The RNC can perform a serving radio network controller (SRNC) function, a controlling radio network controller (CRNC) function or both functions.

In here, the SRNC function is directly connected to a mobile station 100 and allocates radio resources to the mobile station 100, and in case of call connecting, the RNC interlocks with a radio communication core network 300 to provide service to the mobile station 100. Only one CRNC function exists in the whole UTRAN 200 and the CRNC is a kind of RNC that controls a logical channel over the whole UTRAN 200.

Figure 1:
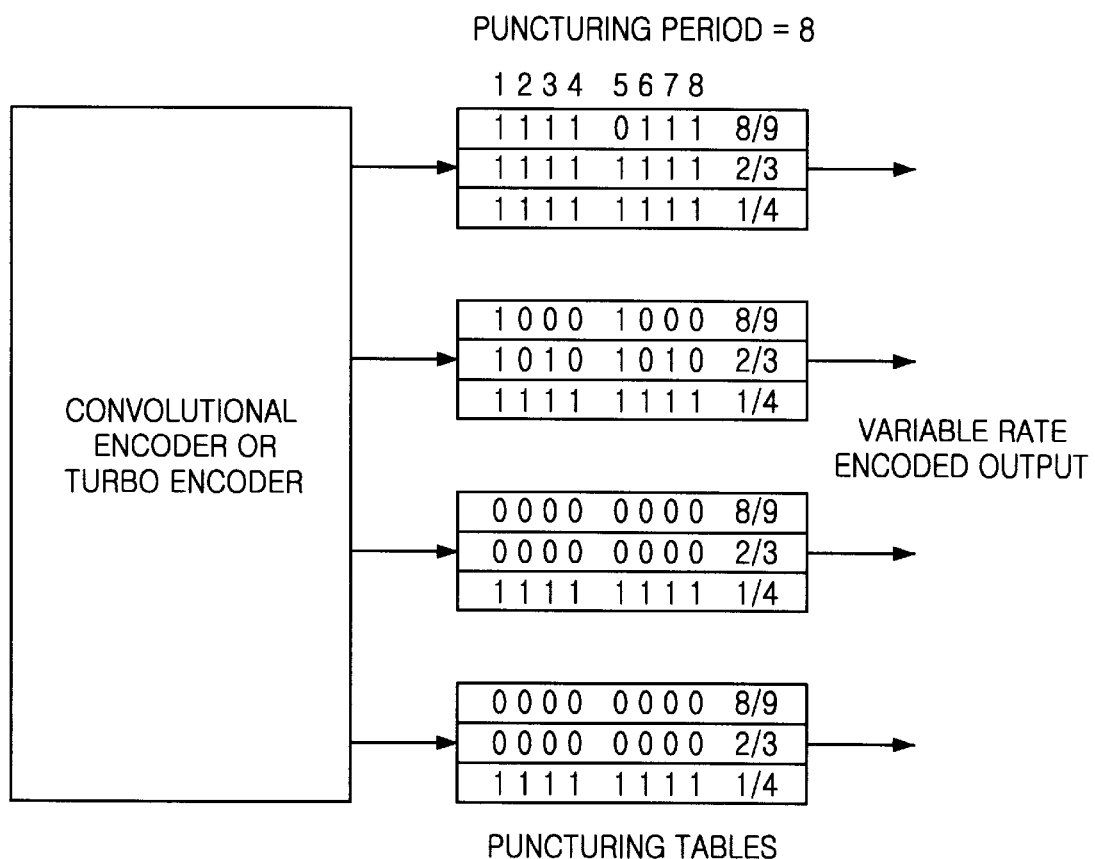
FIG. 1 is a diagram illustrating a general RCPC or RCPT code.
Figure 2:
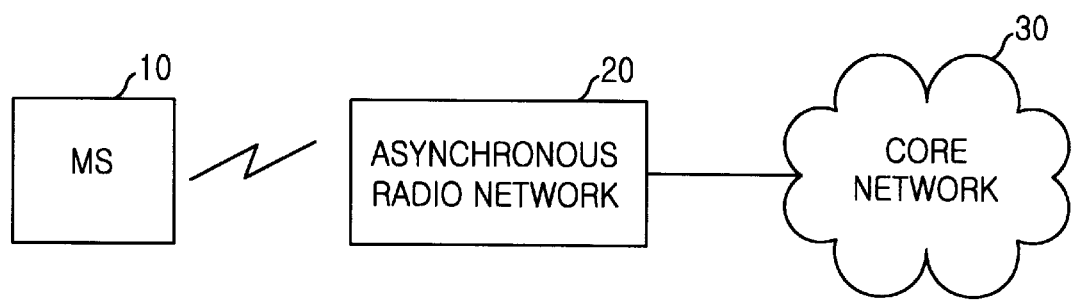
FIG. 2 is a diagram showing a general W-CDMA network.
Figure 3:
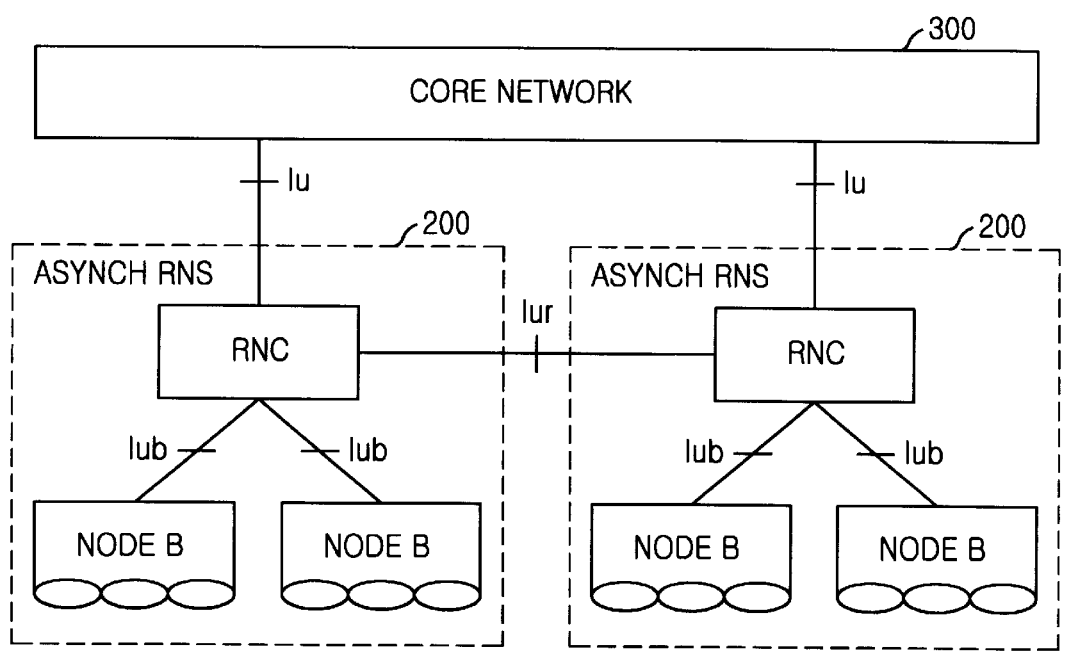
FIG. 3 is a diagram showing a general UTRAN.
Figure 4:
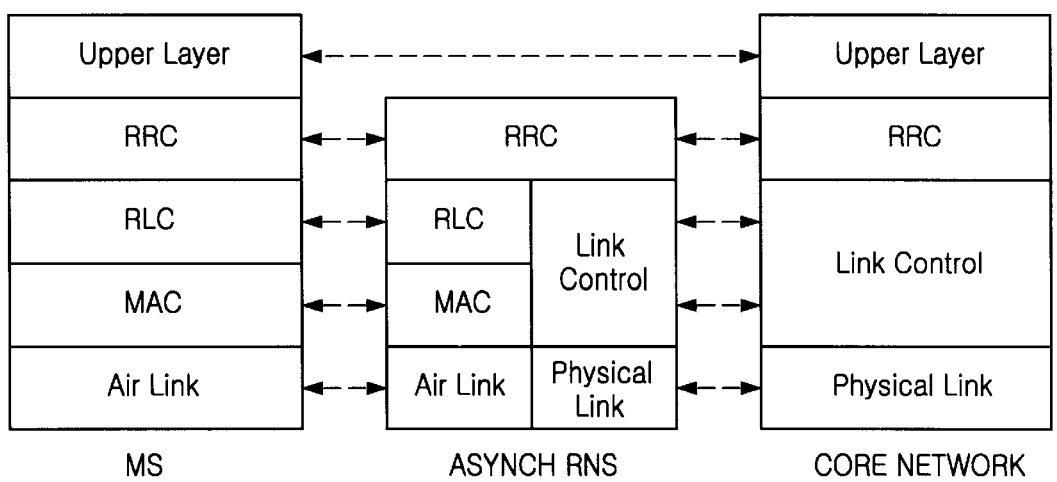
FIG. 4 is a diagram showing protocol stacks in UTRAN.
Figure 5A:
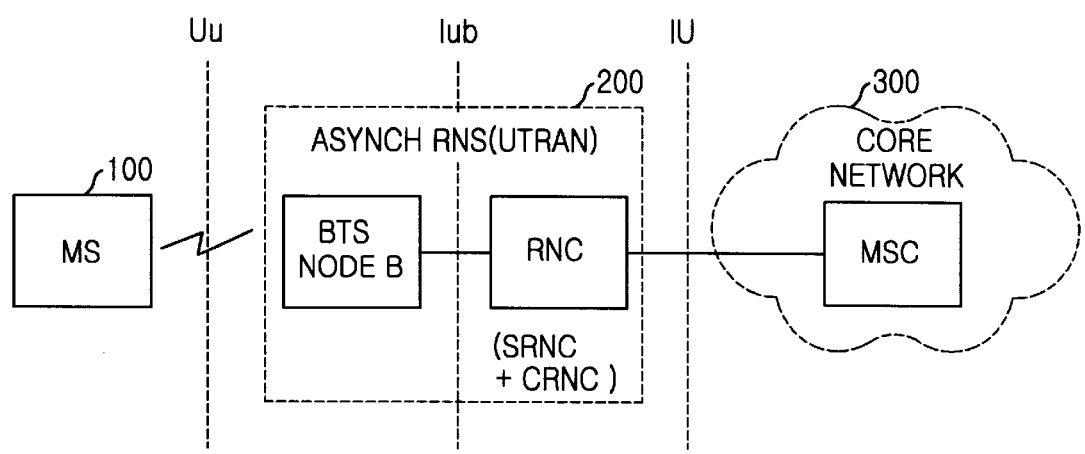
FIG. 5A is a diagram showing a UTRAN when RNC has both of SRNC and CRNC function in accordance with the present invention.
Figure 5B:
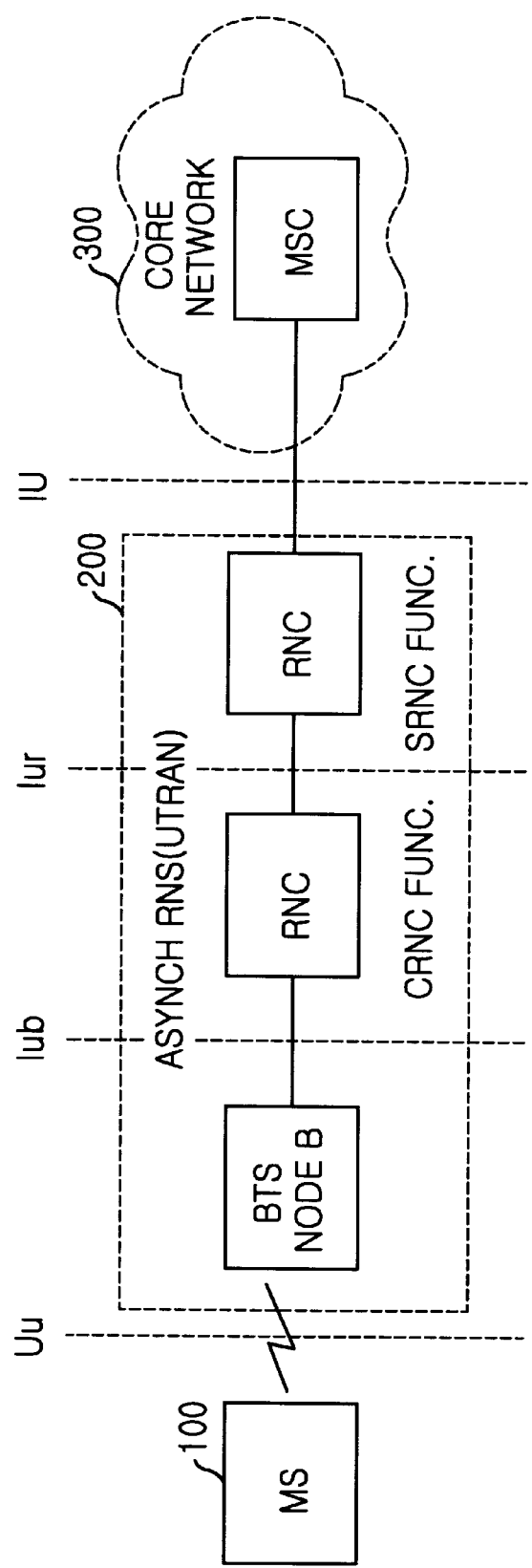
FIG. 5B is a diagram showing UTRAN when RNC has CRNC function and other RNC has SRNC function in accordance with the present invention.

Referring to FIGS. 5A and 5B, the interlocking structure and the logical interface are illustrated. In FIG. 5A, one RNC performs both of the SRNC and the CRNC functions. In FIG. SB, one RNC performs the CRNC function and another RNC performs the SRNC function.

The present invention applies to a hybrid ARQ type II/III method in which there is one RNC having the CRNC and the SRNC functions in the UTRAN 200 and uses a transport channel, such as a downlink shared channel (DSCH), in an interlocking structure as FIG. 5A.

That is, as a preferred embodiment, the present embodiment assumes the CRNC and the SRNC exists on the same asynchronous radio network.

Figure 6:
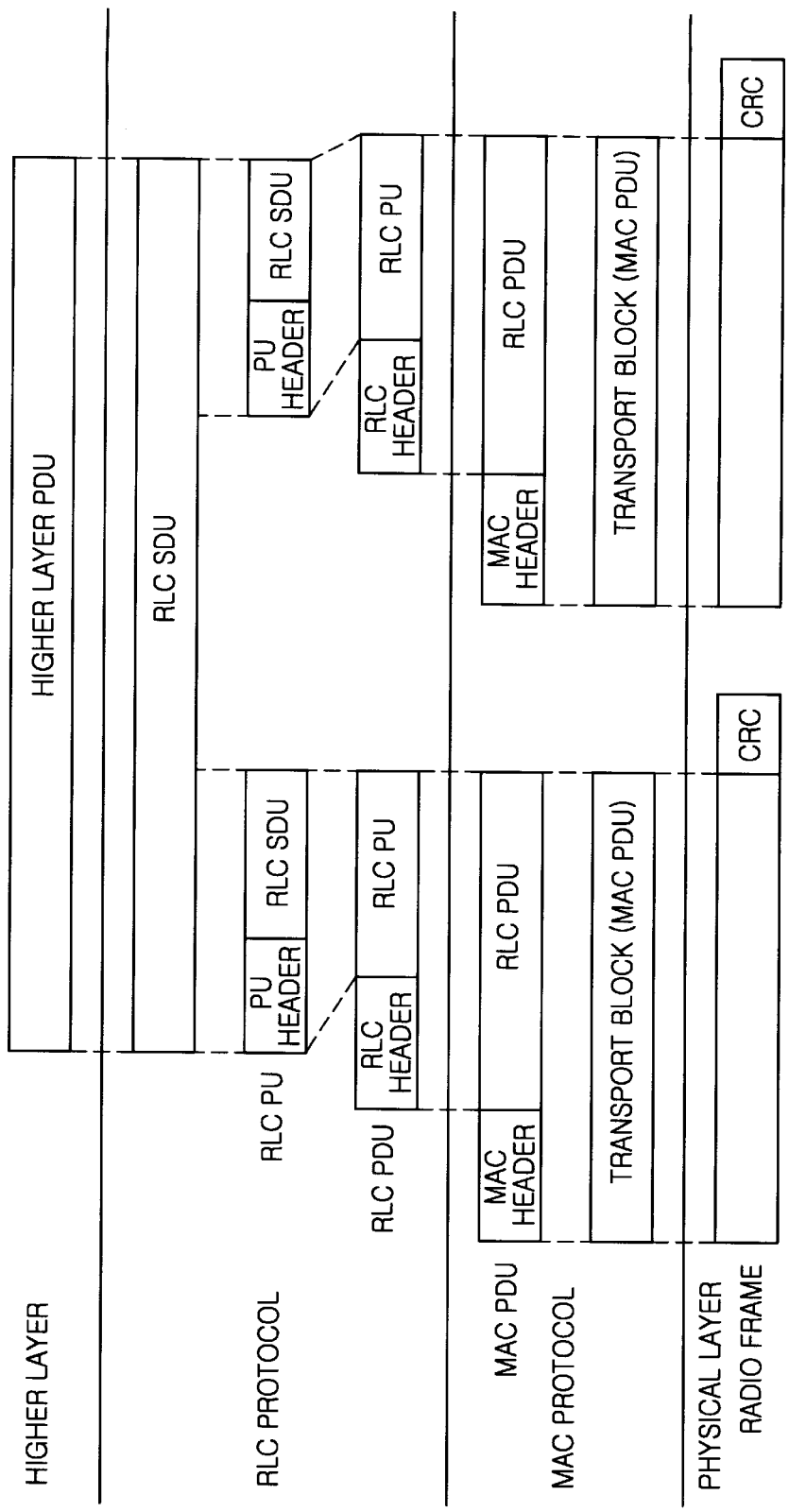
FIG. 6 is a diagram showing relations among conventional RLC-PU, RLC-PDU, MAC-PDU and transport block.

FIG. 6 is a diagram showing relations among conventional RLC-PU, RLC-PDU, MAC-PDU and a transport block.

As described in FIG. 6, a RLC-PDU includes one or more RLC-PU. The RLC-PDU is mapped to the MAC-PDU. The MAC-PDU is mapped to a transport block of a physical layer, and then CRC is added thereto.

In the physical layer, data is transmitted through an encoding unit, a rate matching unit, an interleaver and a modulating unit. Tin the receiving part, the CRC of the data is checked after the data passes through a demodulating unit, a deinterleaver, and decoding unit, to determine whether an error exists or not. If the error exists in the data, then the receiving part requests re-transmission of the data and stores the error-generating data in a buffer. At this time, the re-transmitted RLC-PDU is combined with the error-generating RLC-PDU to carry out a decoding, and then the CRC is checked. In this case, the sequence number and the version of currently received RLC-PDU neet to be known to carry out combining.

To solve the problem, a HARQ-RLC-Control-PDU, which has information about a header of the RLC-PDU is generated. The HARQ-RLC-Control-PDU is transmitted along with the RLC-PDU. That is, a RLC protocol entity generates the RLC-PDU and generates the HARQ-RLC-Control-PDU referring to the information on the header of the RLC-PDU.

The RLC protocol entity transmits the RLC-PDU and the HARQ-RLC-Control-PDU to a MAC-D protocol entity. At this time, the RLC-PDU and the HARQ-RLC-Control-PDU can be transmitted through a different or the same type of logical channel.

In case of using a different type of logical channel, the RLC-PDU and the HARQ-RLC-Control-PDU may use logical channels, such as a dedicated traffic channel (DTCH) and a dedicated control channel (DCCH), respectively, and MAC-Data-REQ is used as a primitive.

In case of using the same type of logical channel, the RLC-PDU and the HARQ-RLC-Control-PDU may use a logical channel such as DTCH and the MAC-Data-REQ is used as a primitive.

The MAC-D protocol entity transmits the received RLC-PDU and the HARQ-RLC-Control-PDU to a MAC-C/SH entity, and the MAC-C/SH transforms the RLC-PDU and the HARQ-RLC-Control-PDU to MAC-PDU and HARQ-MAC-Control-PDU, respectively. The data is then transmitted to the physical layer in a transport block form using a transport channel, such as the DSCH, and PHY-Data-REQ is used as a primitive.

In the physical layer, CRC is added to the transport block, received through a transport channel such as the DSCH, and the transport block is transmitted to the receiving part through a physical channel, after passing an encoding unit, a rate matching unit, an interleaver and a modulating unit.

Figure 7:
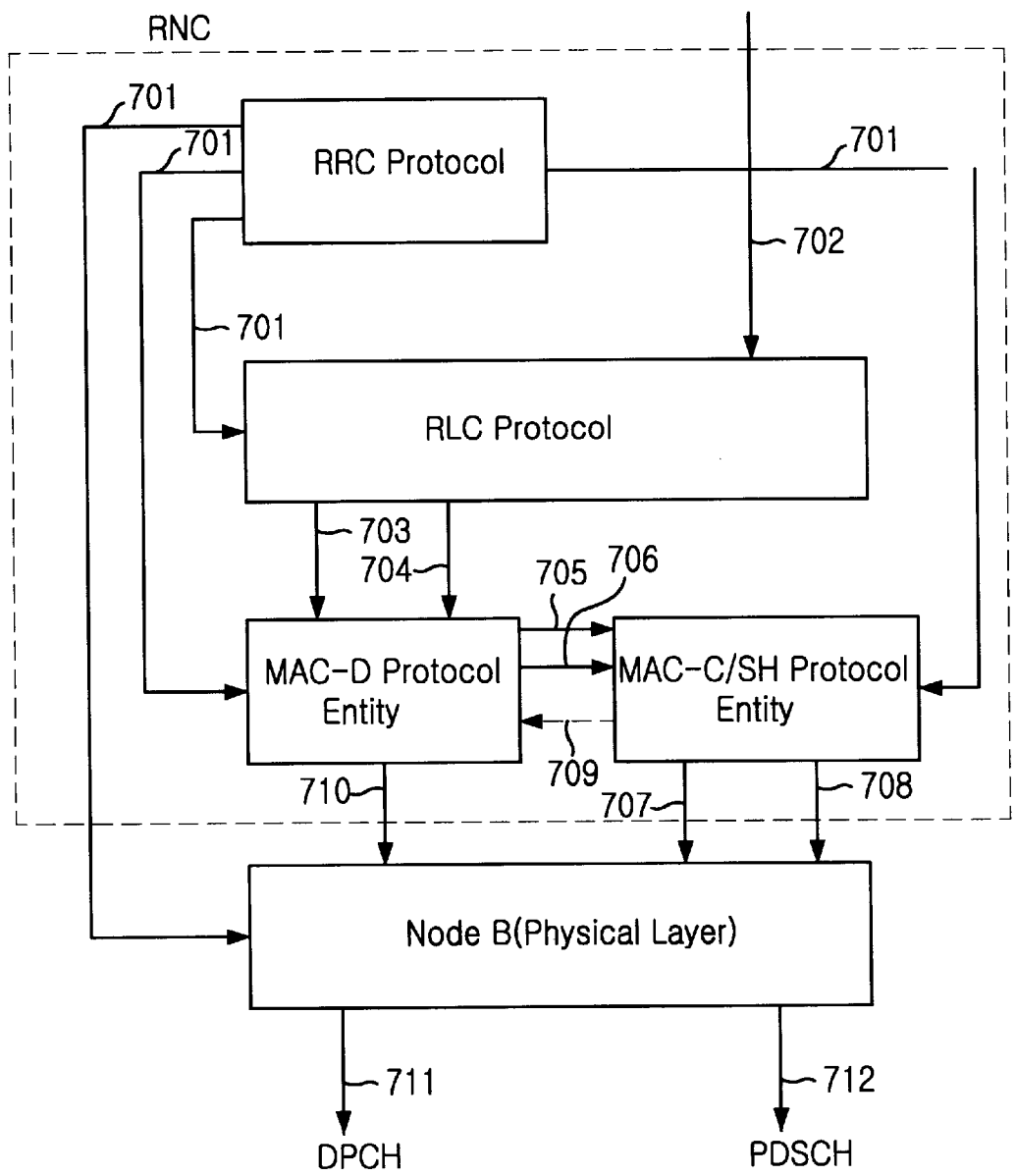
FIG. 7 is a diagram showing a data processing method of a transmitting part in accordance with the present invention.

FIG. 7 is a flow diagram showing a data processing method in a transmitter in accordance with the present invention.

As shown in FIG. 7, a RLC protocol entity, a MAC-D protocol entity, a MAC-C/SH protocol entity and a physical layer entity are initialized at step 701 by a RRC protocol entity.

After that, the RLC protocol receives data, which is to be transmitted to the receiving part, from an upper layer at step 702. At this time, the RLC protocol entity converts the received data to RLC-PDU and generates HARQ-RLC-Control-PDU used for the hybrid ARQ type II/III based on header information of the RLC-PDU. The RLC protocol entity transmits the RLC-PDU and the HARQ-RLC-Control-PDU to the MAC-D protocol entity through a different or the same logical channel at steps 703 and 704.

In case of using the different type of the logical channel, the RLC protocol entity transmits the RLC-PDU to the MAC-D protocol entity through a logical channel, such as the DTCH at step 703 and the HARQ-RLC-Control-PDU is transmitted to the MAC-D protocol entity through a logical channel, such as the DCCH at step 704.

Meanwhile, in case of using the same type of the logical channel, the RLC protocol entity transmits the RLC-PDU and the HARQ-RLC-Control-PDU to the MAC-D protocol entity through a logical channel, such as the DTCH.

In this specification, for simplification, we describe the process transmitting the RLC-PDU and the HARQ-RLC-Control-PDU from the RLC protocol entity to the MAC-D protocol entity of the SRNC through different logical channels. In the RLC-protocol entity operation, a relation indicator is generated to maintain association between the RLC-PDU and the HARQ-RLC-Control-PDU, and when the RLC-PDU and the HARQ-RLC-Control-PDU are transmitted, the relation indicator may be transmitted along with each PDU.

Next, the MAC-D protocol entity that receives the RLC-PDU and the HARQ-RLC-Control-PDU from the RLC protocol entity transmits them to the MAC-C/SH protocol entity at steps 705 and 706.

In here, the MAC-C/SH protocol entity, which receives the RLC-PDU from the MAC-D protocol entity, transforms the RLC-PDU to the MAC-PDU and schedules the DSCH transport channels to transmit the MAC-PDU through the transport channel, such as the DSCH. Then the MAC-PDU is transmitted to the physical layer of the node B through the DSCH channel at step 707.

Moreover, the MAC-C/SH protocol entity transforms the HARQ-RLC-Control-PDU received from the MAC-D protocol entity to HARQ-MAC-Control-PDU. (To differentiate the MAC-PDUs which are transformed from the RLC-PDU and the HARQ-RLC-Control-PDU, respectively, in this specification, the former is called the MAC-PDU and the latter the HARQ-MAC-Control-PDU.) Then, the MAC-C/SH schedules the DSCH transport channels to transmit the HARQ-MAC-Control-PDU. The MAC-C/SH protocol entity transmits the HARQ-MAC-Control-PDU to the physical layer of the node B through the DSCH transport channel at step 708.

In here, if the MAC-C/SH protocol entity receives the relation indicator from the RLC protocol entity, wherein the relation indicator denotes a relation between the RLC-PDU and the HARQ-RLC-Control-PDU, with each PDU, the MAC-C/SH protocol entity operates processes at steps 707 and 708 to the RLC-PDU and the HARQ-RLC-Control-PDU to assure that each of them has the same relation indicator value.

The MAC-C/SH protocol entity transmits a transport format indicator 1 (TFI1) and a transport format indicator 2 (TFI2) of the MAC-PDU and the HARQ-MAC-Control-PDU, respectively to the MAC-D at step 709. The MAC-D protocol entity transmits the TFI1 and the TFI2 to the physical layer of the node B at step 710.

After that, the physical layer of the node B which receives the MAC-PDU and the HARQ-MAC-Control-PDU carries out an encoding, a rate matching and an interleaving and modulation, then transforms the MAC-PDU and the HARQ-MAC-Control-PDU to a radio frame and transmits it to the receiver through a physical channel, such as PDSCH at step 712.

The node B that receives TFI1, TFI2 and TFI of DCH from the MAC-D forms a transport format combination set (TFCI) and transmits the TFCI to the receiver through a physical channel, such as DPCH at step 711.

Figure 8:
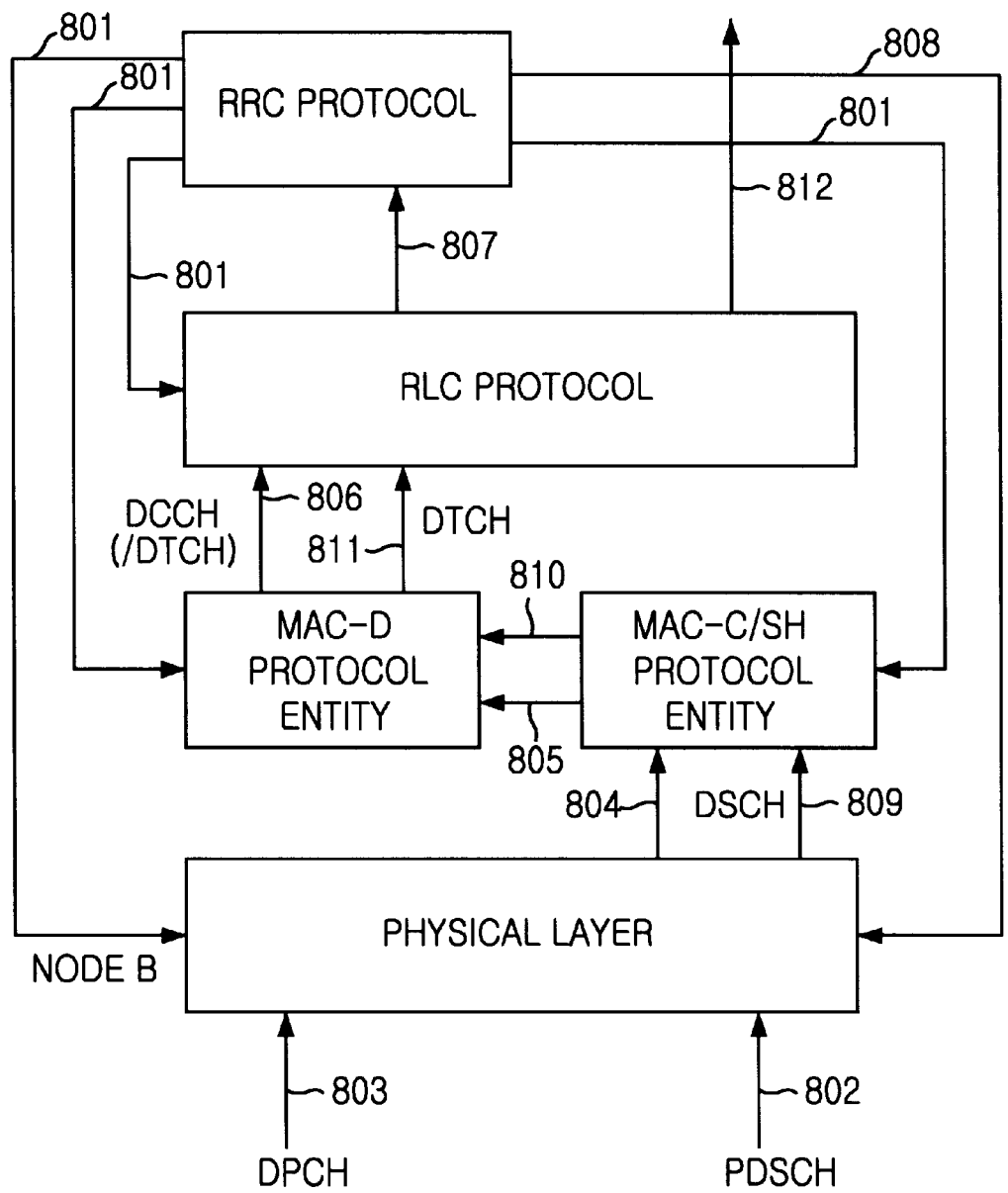
FIG. 8 is a diagram showing a data processing method of a receiving part in accordance with the present invention.

FIG. 8 is a diagram showing a data processing method of a receiving part in accordance with the present invention.

As illustrated in FIG. 8, a RLC protocol entity, a MAC-D protocol entity, a MAC-C/SH protocol entity and a physical layer are initialized by a RRC protocol entity.

The physical layer of the receiver receives the radio frame having the RLC-PDU and the HARQ-RLC-Control-PDU transmitted through the physical channel, such as the PDSCH. The physical layer of the receiver also receives the TFCI, which is essential information to carry out the physical layer operation on the RLC-PDU and the HARQ-RLC-Control-PDU at step 803.

Next, the physical layer of the receiving part transmits the received data to the MAC-C/SH protocol entity through the physical channel, such as the DPCH at step 804.

The physical layer acquires the TFI2 of the HARQ-RLC-Control-PDU received through the physical channel, such as the PDSCH, from the TFCI received from the physical channel, such as the DPCH, and transforms the TFI2 to the HARQ-MAC-Control-PDU through a demodulation, a deinterleaving and a decoding process, then transmits the HARQ-MAC-Control-PDU to the MAC-C/SH protocol entity through the transport channel, such as the DSCH at step 804.

The MAC-C/SH protocol entity receives the HARQ-MAC-Control-PDU having the HARQ-RLC-Control-PDU, and data identifier, and transforms the HARQ-MAC-Control-PDU to the HARQ-RLC-Control-PDU then transmits the HARQ-RLC-Control-PDU and the data identifier to the MAC-D protocol entity at step 805.

Then, the MAC-D protocol entity, which receives the HARQ-RLC-Control-PDU and the data identifier, transmits them to the RLC protocol entity by using the logical channel such as the DCCH at step 806. At this time, in case of using the same type of the logical channel, the MAC-D protocol entity, which receives the HARQ-RLC-Control-PDU and the data identifier from the MAC-C/SH protocol entity, transmits the HARQ-RLC-Control-PDU and the data identifier to the RLC protocol entity by using the logical channel, such as the DTCH.

After that, the RLC protocol entity extracts a sequence number and a version number by interpreting the received HARQ-RLC-Control-PDU and transmits CRLC-HARQ-IND primitive, which has the sequence number, the version number and the data identifier as parameters, to the RRC protocol entity, through a control SAP at step 807.

Next, the RRC protocol entity transmits a CPHY-HARQ-REQ primitive, which has a parameter of the CRLC-HARQ-IND primitive such as the sequence number and the version number, to the physical layer through the control SAP of the RRC and L1 at step 808.

The physical layer of the receiving part extracts the radio frame, which has the RLC-PDU stored in the buffer, and the TFI1 by using the received data identifier, then transforms the radio frame to MAC-PDU by the demodulating, the deinterleaving and the decoding process using the TFI1, the sequence number and the version number, and transmits the MAC-PDU to the MAC-C/SH protocol entity through the transport channel, such as the DSCH at step 809.

Subsequently, the MAC-C/SH protocol entity interprets the received MAC-PDU and transforms it to the RLC-PDU, then transmits the RLC-PDU to the MAC-D protocol entity at step 810.

The MAC-D protocol entity transmits the received RLC-PDU to the RLC protocol entity through the logical channel such as the DTCH at step 811. The RLC protocol entity interprets the received RLC-PDU and transmits it to an upper layer at step 812.

Figure 9:
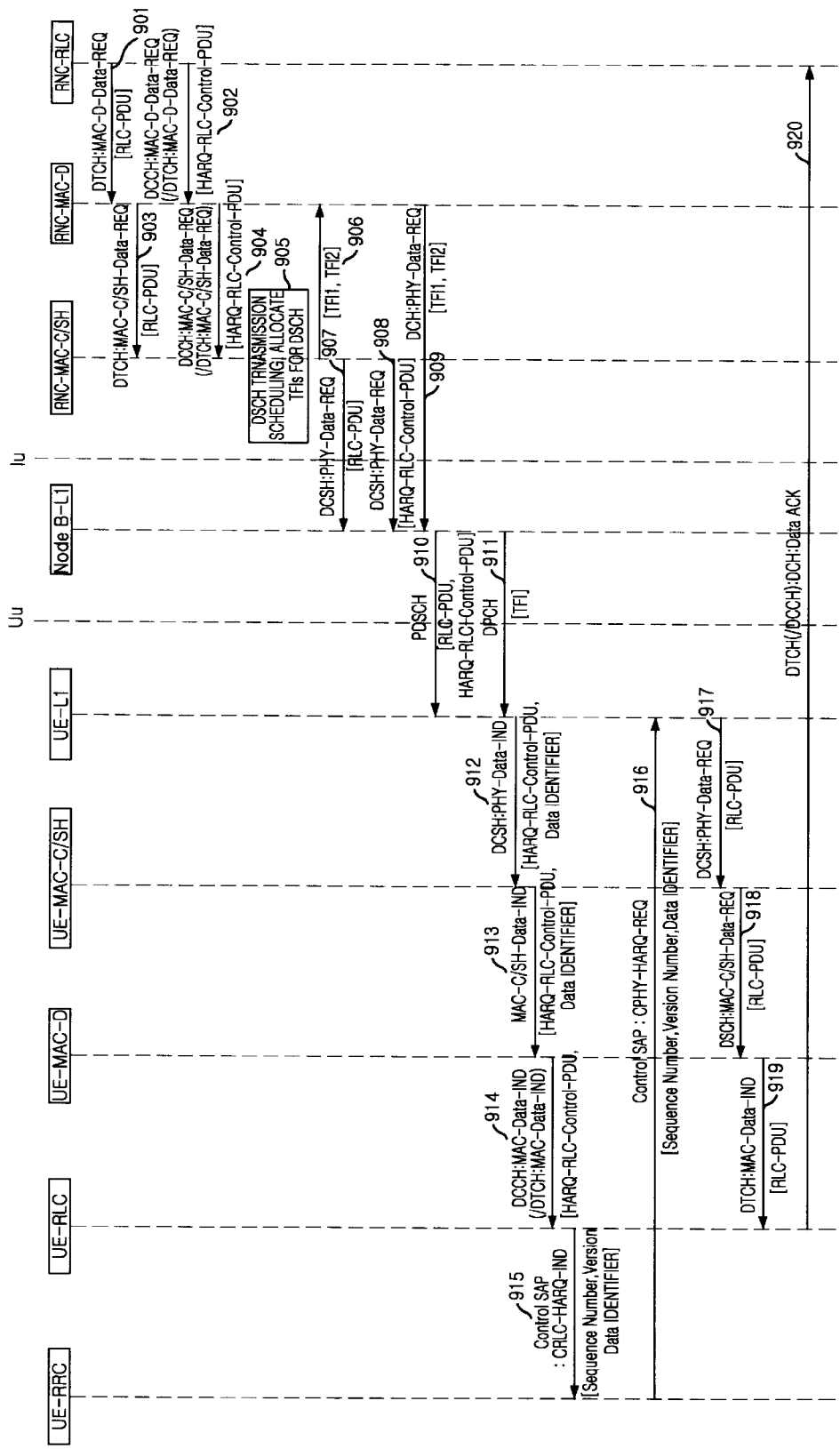
FIG. 9 is a flowchart showing a data processing method in accordance with the present invention.

FIG. 9 is a flowchart showing a data processing method in accordance with the present invention.

First, RNC-RLC, which receives data from the upper layer, transforms the received data to the RLC-PDU and transmits the RLC-PDU to RNC-MAC-D protocol entity through the logical channel (MAC-D-Data-REQ primitive), such as the DTCH at step 901.

The RNC-RLC protocol entity generates the HARQ-RLC-Control-PDU by using information in a header of the RLC-PDU. At this time, the HARQ-RLC-Control-PDU includes a sequence number and a version number. The RNC-RLC protocol entity transmits the HARQ-RLC-Control-PDU to the RNC-MAC-D protocol entity through a logical channel (MAC-D-Data-REQ primitive), such as the DCCH at step 902.

In case of using the same type of the logical channel, the RNC-RLC protocol entity transmits the HARQ-RLC-Control-PDU to the RNC-MAC-D protocol entity through the logical channel (MAC-D-Data-REQ primitive), such as the DTCH.

Next, the RNC-MAC-D protocol entity that receives the RLC-PDU through the logical channel (MAC-D-Data-REQ primitive), such as the DTCH, transmits the RLC-PDU by using MAC-C/SH-Data-REQ primitive at step 903.

The RNC-MAC-D protocol entity that receives the HARQ-RLC-Control-PDU through the logical channel (MAC-D-Data-REQ primitives), such as the DCCH, transmits the HARQ-RLC-Control-PDU protocol entity to the RNC-MAC-C/SH protocol entity by using the MAC-C/SH-Data-REQ primitive at step 904.

In case of using the same type of the logical channel, the RNC-MAC-D protocol entity that receives the HARQ-RLC-Control-PDU through the logical channel (MAC-D-Data-REQ primitive), such as the DTCH, transmits the HARQ-RLC-Control-PDU to the RNC-MAC-C/SH protocol entity by using the MAC-C/SH-Data-REQ primitive.

Meanwhile, the RNC-MAC-C/SH protocol entity carries out DSCH transmission scheduling to transmit the RLC-PDU and the HARQ-RLC-Control-PDU by the transport channel, such as the DSCH, and transforms the RLC-PDU and the HARQ-RLC-Control-PDU to the MAC-PDU and the HARQ-MAC-Control-PDU, respectively, and then allocates TFL1 and TFI2, respectively at step 905.

The RNC-MAC-C/SH protocol entity transmits the TFI1 and the TFI2 to the MAC-D protocol entity at step 906. Then, the MAC-D protocol entity transmits the TFI1 and the TFI2 to the physical layer through a transport channel (PHY-Data-REQ primitive), such as DCH at step 909.

Also, the RNC-MAC-C/SH protocol entity transmits the MAC-PDU to the physical layer of the node B through the transport channel (PHY-Data-REQ primitive), such as the DSCH. At this time, the transmission form is defined by an Iub interface that defines an interface between the RNC and the node B.

Moreover, the RNC-MAC-C/SH protocol entity transmits the HARQ-MAC-Control-PDU to the physical layer of the node B through the transport channel (PHY-Data-REQ primitive), such as the DSCH at step 908. At this time, the transmission form is defined by an Iub interface that defines an interface between the RNC and the node B.

After that, the physical layer of the node B transmits the received MAC-PDU and the HARQ-MAC-Control-PDU to a user equipment (UE) after transforming them to a PDSCH radio frame through the coding, the interleaving and the modulating process at step 910.

The physical layer of the node B generates TFCI from the received TFI1 and the TFI2 and transmits the TFCI to the UE through the physical channel, such as the DPCH at step 911.

UE-L1 of the receiving part receives the radio frame having the RLC-PDU and the HARQ-RLC-Control-PDU, through the physical channel, such as the PDSCH, and receives the TFI1 and the TFI2 through the physical channel, such as the DPCH, then carries out the demodulating, the deinterleaving and the decoding process to the radio frame having the TFI2 and the HARQ-RLC-Control-PDU. The UE-L1 stores the radio frame, which has the received TFI1 and the RLC-PDU, to the buffer and generates a data identifier to identify the radio frame stored in the buffer. After that, the UE-L1 transmits the received HARQ-RLC-Control-PDU and the data identifier to a UE-MAC-C/SH protocol entity through the transport channel (PHY-Data-IND primitive), such as the DSCH at step 912.

After that, the UE-MAC-C/SH protocol entity transmits the HARQ-RLC-Control-PDU and the data identifier to a UE-MAC-D protocol entity by using MAC-C/SH-Data-IND primitive at step 913.

The UE-MAC-D protocol entity transmits the HARQ-RLC-Control-PDU and the data identifier to a UE-RLC protocol entity through the logical channel (MAC-D-Data-IND primitive), such as the DCCH at step 914. At this time, in case of using the same type of the logical channel, the UE-MAC-D protocol entity transmits the HARQ-RLC-Control-PDU and the data identifier to the UE-RLC protocol entity through the logical channel (MAC-D-Data-IND primitive), such as the DTCH.

The UE-RLC protocol entity extracts a sequence number and a version number by interpreting the received HARQ-RLC-Control-PDU. Also, the UE-RLC protocol entity transmits the data identifier, the sequence number and the version number to a UE-RRC protocol entity as a primitive of CRLC-HARQ-IND, by using a control SAP defined between the UE-RLC and the UE-RRC at step 915.

After that, the UE-RRC protocol entity transmits CPHY-HARQ-REQ primitive, which has the received data identifier, the sequence number and the version number as a primitive parameter, to the UE-L1 by using a control SAP defined between the UE-L1 and the UE-RRC at step 916.

Subsequently, the UE-L1 extracts the radio frame, which has the RLC-PDU stored in the buffer, and the TFI1 by using the data identifier and determines whether to perform the decoding process directly to the stored radio frame, or after combining the stored radio frame with the pre-received data based on the TFI1, the sequence number and the version number. Then, after the decoding process, the UE-L1 transmits them to a UE-MAC-C/SH protocol entity through the transport channel (PHY-Data-IND primitive), such as the DSCH at step 917.

The UE-MAC-C/SH protocol entity transmits the received RLC-PDU to the UE-MAC-D protocol entity by using MAC-C/SH-Data-IND at step 918.

Accordingly, the LE-MAC-D protocol entity transmits the received RLC-PDU to the UE-RLC protocol entity through the logical channel (MAC-D-Data-IND primitive), such as the DTCH at step 919.

Finally, the UE-RLC protocol entity interprets the received RLC-PDU and transmits it to an upper layer after transforming the RLC-PDU to the original data form, and then transforms the response to a RNC-RLC protocol entity at step 920.

In the present invention, in case of an asynchronous mobile communication system that uses the hybrid ARQ type II/III, there needs be no changes to a conventional RLC protocol entity operation. That is, the pre-determined kinds and format of the RLC data PDU and the control PDU are not changed and HARQ-RLC-Control-PDU of a new RLC-PDU type are added.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A data processing method for a hybrid ARQ type II/III downlink of a wide-band radio communication system, wherein a serving radio network controller (hereinafter, referred to as a SRNC) which is directly connected to a user equipment to allocate wireless resources to the user equipment and provides services by interlocking with a wireless communication core network in case of a call connection and a controlling radio network controller (hereinafter, referred to as a CRNC) which controls a sharing channel of a radio network are located on the same radio network, comprising the steps of:

a) generating a radio link control-protocol data unit (hereinafter, referred to as a RLC-PDU) in a radio link control (hereinafter, referred to as a RLC) layer of the SRNC and generating a ptotocol data unit having RLC-PDU information needed for supporting the hybrid ARQ type II/III based on a header of the RLC-PDU (hereinafter, referred to as a HARQ-RLC-Control-PDU);

b) transmitting the RLC-PDU and the HARQ-RLC-Control-PDU to a medium access control dedicated (hereinafter, referred to as a MAC-D), treating a general user part of a MAC layer, through a logical channel;

c) transmitting the RLC-PDU and the HARQ-RLC-Control-PDU of the MAC-D to a medium access control common/shared (hereinafter, referred to as a MAC-C/SH), treating a common/shared channel part of the MAC layer;

d) transforming the RLC-PDU and the HARQ-RLC-Control-PDU to MAC-PDU and the HARQ-MAC-Control-PDU, respectively, in the MAC-C/SH and allocating a transport format indicator 1 (TFI1) of the MAC-PDU and a transport format indicator 2 (TFI2) of the HARQ-MAC-Control-PDU and transmitting the TFI1 and TFI2 to the MAC-D, and transmitting the MAC-PDU and the HARQ-MAC-Control-PDU to a physical layer of BTS, through a transport channel; and e) forming the TFI1 and the TFI2 in the MAC-D to a transport format combination set (TFC1), then transmitting the TFC1 to the user equipment through a first physical channel, and transforming the MAC-PDU and the HARQ-MAC-Control-PDU to a radio frame, then transmitting the radio frame to the mobile station through a second physical channel.

2. The data processing method as recited in claim 1, wherein the RLC layer generates an relation indicator representing a relation between the RLC-PDU and the HARQ-RLC-Control-PDU, and transmits the RLC-PDU and the HARQ-RLC-Control-PDU along with each PDU.

3. The data processing method as recited in claim 2, wherein the relation indicator is made to each of the HARQ-RLC-Control-PDU generated based on the RLC-PDU and the header of the RLC-PDU, and in case of having a relation between the RLC-PDU and the HARQ-RLC-Control-PDU, the relation indicator has the same value.

4. The data processing method as recited in claim 3, wherein the MAC-C/SH treats the RLC-PDU and the HARQ-RLC-Control-PDU simultaneously, in case of receiving the relation indicator along with each of the RLC-PDU through the MAC-D from the RLC layer.

5. The data processing method as recited in claim 1, further comprising the step of: f) storing the RLC-PDU in a buffer, extracting the RLC-PDU from the buffer by using the HARQ-RLC-Control-PDU, transmitting the RLC-PDU to an upper layer after interpreting and transmitting a response to the radio network.

6. The data processing method as recited in claim 5, wherein the step f) includes the steps of:

f1) receiving a radio frame, which has the RLC-PDU and the HARQ-RLC-Control-PDU PDU, and information (TFCI) required for performing a physical layer operation;

f2) transmitting the TFCI to the MAC-D of the user equipment (UE);

f3) obtaining the TFI2 of the HARQ-RLC-Control-PDU from the TFCI and transmitting the TFI2 to MAC-C/SH of the UE, through a demodulating, a deinterleaving and a decoding process;

f4) when performing the step f3), storing the radio frame having the RLC-PDU to the buffer, generating a data identifier for identifying the buffer storing the RLC-PDU and transmitting the data identifier to the MAC-C/SH of the UE, with the HARQ-RLC-Control-PDU;

f5) receiving the HARQ-MAC-Control-PDU, which has the HARQ-RLC-Control-PDU, and the data identifier, transforming the HARQ-MAC-Control-PDU to the HARQ-RLC-Control-PDU and transmitting the HARQ-RLC-Control-PDU and the data identifier to MAC-D of the UE;

f6) transmitting the HARQ-RLC-Control-PDU and the data identifier to the RLC layer of the UE, through a logical channel;

f7) interpreting the HARQ-RLC-Control-PDU to extract a sequence number and a version number of the RLC-PDU and transmitting the sequence number, the version number and the data identifier to a radio resource control (RRC) layer of the UE;

f8) transmitting the sequence number, the version number and the data identifier of the PDU to the physical layer of the UE;

f9) extracting the radio frame having the RLC-PDU from the buffer, and the TFI1, by using the data identifier, and by using the TFI1, the sequence number and the version number, transforming the extracted radio frame to MAC-PDU through modulating, a deinterleaving and a decoding process, and then transmitting the radio frame to MAC-C/SH of the UE;

f10) at the MAC-C/SH of the UE, transforming the MAC-PDU to the RLC-PDU, after interpreting the MAC-PDU, and transmitting the RLC-PDU to the MAC-D of the UE;

f11) at the MAC-D of the UE, transmitting the RLC-PDU to the RLC layer of the UE through a logical channel; and f12) transmitting the RLC-PDU which is received from RLC layer of the UE, after interpreting the RLC-PDU, and transmitting a response to the radio network.

7. The data processing method as recited in claim 6, wherein in the step f7), the RLC layer of the UE interprets the received HARQ-RLC-Control-PDU and after extracting a sequence number and a version number, the sequence number, the version number and the data identifier are transmitted to a RRC layer of the UE through CRLC-HARQ-IND primitive.

8. The data processing method as recited in claim 6, wherein in the step f8), the RRC layer of the UE transmits the sequence number, the version number and the data identifier to the physical layer of the UE through a CPHY-HARQ-REQ primitive.

9. The data processing method as recited in claim 1, wherein the step d) includes the steps of:

d1) receiving the RLC-PDU and the HARQ-RLC-Control-PDU from the MAC-D;

d2) allocating the TFI1 and the TFI2 to the RLC-PDU and the HARQ-RLC-Control-PDU, respectively, and transmitting the TFI1 and the TFI2 to the MAC-D;

d3) transforming the received RLC-PDU and the HARQ-RLC-Control-PDU to the MAC-PDU and the HARQ-MAC-Control-PDU, respectively, and carrying out transmission scheduling to transmitting the MAC-PDU and the HARQ-MAC-Control-PDU by using transport channel;

d4) transmitting the MAC-PDU and the HARQ-MAC-Control-PDU to the physical layer of the UE; and d5) in case of receiving the relation identifier with each of the PDU, through the MAC-D, when carrying out the steps d3) and d4), the RLC-PDU and the HARQ-RLC-Control-PDU are processed based on the relation identifier.

10. The data processing method as recited in claim 1, wherein the step d) includes the steps of:

d1) forming the TFI1 and the TFI2 to the TFCI by the MAC-D and transmitting the TFCI to the UE through the first physical channel; and d2) transforming the RLC-PDU and the HARQ-RLC-Control-PDU to a radio frame through an encoding, a rate matching and an interleaving, then transmitting the transformed radio frame to the UE through the second physical channel.

11. The data processing method as recited in claim 10, wherein the logical channel is a dedicated traffic channel (DTCH) logical channel for transmitting the RLC-PDU and the HARQ-RLC-Control-PDU.

12. The data processing method as recited in claim 10, wherein the logical channel includes the DTCH and a dedicated control channel (DCCH) logical channels for transmitting the RLC-PDU and the HARQ-RLC-Control-PDU, respectively.

13. The data processing method as recited in claim 10, wherein the transport channel includes a downlink shared channel (DSCH) for transmitting the RLC-PDU and the HARQ-RLC-Control-PDU.

14. The data processing method as recited in claim 10, wherein the first physical channel includes a dedicated physical channel (DPCH) for transmitting the TFCI.

15. The data processing method as recited in claim 14, wherein the second physical channel includes a physical downlink shared channel (PDSCH) for transmitting the MAC-PDU and the HARQ-MAC-Control-PDU.

16. The data processing method as recited in claim 10, wherein the radio network is an asynchronous radio network.

17. A computer readable data recording media having instructions for implementing a method for a hybrid ARQ type II/III on a downlink of a wide-band radio communication system, wherein a serving radio network controller (hereinafter, referred to as a SRNC) which is directly connected to a user equipment to allocate wireless resources to the user equipment and provides services by interlocking with a wireless communication core network in case of a call connection and a controlling radio network controller (hereinafter, referred to as a CRNC) which controls a sharing channel of a radio network are located on the same radio network, comprising the functions of:

a) generating a radio link control-protocol data unit (hereinafter, referred to as a RLC-PDU) in a radio link control (hereinafter, referred to as a RLC) layer of the SRNC and generating a protocol data unit having RLC-PDU information needed for supporting the hybrid ARQ type II/III based on a header of the RLC-PDU (hereinafter, referred to as a HARQ-RLC-Control-PDU);

b) transmitting the RLC-PDU and the HARQ-RLC-Control-PDU to a medium access control dedicated (hereinafter, referred to as a MAC-D) treating a general user part of a MAC layer through a logical channel;

c) transmitting the RLC-PDU and the HARQ-RLC-Control-PDU of the MAC-D to a medium access control common/shared (hereinafter, referred to as a MAC-C/SH), treating a common/shared channel part of the MAC layer;

d) transforming the RLC-PDU and the HARQ-RLC-Control-PDU to MAC-PDU and the HARQ-MAC-Control-PDU, respectively, in the MAC-C/SH and allocating a transport format indicator 1 (TFI1) of the MAC-PDU and a transport format indicator 2 (TFI2) of the HARQ-MAC-Control-PDU and transmitting the TFI1 and TFI2 to the MAC-D, and transmitting the MAC-PDU and the HARQ-MAC-Control-PDU to a physical layer of BTS, through a transport channel; and e) forming the TFI1 and the TFI2 in the MAC-D to a transport format combination set (TFCI), then transmitting the TFCI to the user equipment through a first physical channel, and transforming the MAC-PDU and the HARQ-MAC-Control-PDU to a radio frame, then transmitting the radio frame to the mobile station through a second physical channel.

18. The computer readable data recording media as recited in claim 17, further comprising the step of: f) storing the RLC-PDU from a buffer, extracting the RLC-PDU of the buffer by using the HARQ-RLC-Control-PDU, transmitting the RLC-PDU to an upper layer after interpreting and transmitting the response to the radio network.

19. The computer readable data recording media as recited in claim 18, wherein the function f) includes the steps of:

f1) receiving a radio frame, which has the RLC-PDU and the HARQ-RLC-Control-PDU, and information (TFCI) required for performing a physical layer operation;

f2) transmitting the TFCI to the MAC-D of the user equipment (UE);

f3) Obtaining the TFI2 of the HARQ-RLC-Control-PDU from the TFCI and transmitting the TFI2 to MAC-C/SH of the UE, through a demodulating, a deinterleaving and a decoding process;

f4) when performing the step f3), storing the radio frame having the RLC-PDU to the buffer, generating a data identifier for identifying the buffer storing the RLC-PDU and transmitting the data identifier to the MAC-C/SH of the UE, with the HARQ-RLC-Control-PDU;

f5) receiving the HARQ-MAC-Control-PDU, which has the HARQ-RLC-Control-PDU, and the data identifier, transforming the HARQ-MAC-Control-PDU to the HARQ-RLC-Control-PDU and transmitting the HARQ-RLC-Control-PDU and the data identifier to MAC-D of the UE;

f6) transmitting the HARQ-RLC-Control-PDU and the data identifier to the RLC layer of the UE, through a logical channel;

f7) interpreting the HARQ-RLC-Control-PDU to extract a sequence number and a version number of the RLC-PDU and transmitting the sequence number, the version number and the data identifier to a radio resource control (RRC) layer of the UE;

f8) transmitting the sequence number, the version number and the data identifier of the PDU to the physical layer of the UE;

f9) extracting the radio frame having the RLC-PDU from the buffer, and the TFI1, by using the data identifier, and by using the TFI1, the sequence number and the version number, transforming the extracted radio frame to MAC-PDU through modulating, a deinterleaving and a decoding process, and then transmitting the radio frame to MAC-C/SH of the UE;

f10) at the MAC-C/SH of the UE, transforming the MAC-PDU to the RLC-PDU, after interpreting the MAC-PDU, and transmitting the RLC-PDU to the MAC-D of the UE;

f11) at the MAC-D of the UE, transmitting the RLC-PDU to the RLC layer of the UE through a logical channel; and f12) transmitting the RLC-PDU which is received from RLC layer of the UE, after interpreting the RLC-PDU and transmitting a response to the radio network.

* * * * *